United States Patent [19]

Ojima

[11] Patent Number: 4,756,060
[45] Date of Patent: Jul. 12, 1988

[54] HOSE BAND

[75] Inventor: Juji Ojima, Ebina, Japan

[73] Assignee: NHK Spring Co., Ltd., Yokohama, Japan

[21] Appl. No.: 906,092

[22] Filed: Sep. 10, 1986

[30] Foreign Application Priority Data

Nov. 18, 1985 [JP] Japan .......................... 60-176954[U]
Mar. 27, 1986 [JP] Japan ................................ 61-67172

[51] Int. Cl.$^4$ ............................................. F16L 33/02
[52] U.S. Cl. .................................... 24/20 CW; 24/20 W
[58] Field of Search ................ 24/20 CW, 20 R, 703, 24/20 W, 20 EE, 23 W, 23 R, 23 EE, 20 TT

[56] References Cited

U.S. PATENT DOCUMENTS

| 1,399,063 | 12/1921 | Leslie | 24/23 W |
| 3,402,436 | 9/1968 | Oetiker | 24/20 CW |
| 4,222,155 | 9/1980 | Oetiker | 24/20 CW X |
| 4,299,012 | 11/1981 | Oetiker | |
| 4,430,775 | 2/1984 | Arthur | 24/20 CW |
| 4,517,708 | 5/1985 | Calmettes et al. | 24/20 CW |
| 4,541,145 | 9/1985 | Sato et al. | 24/20 EE |
| 4,557,024 | 12/1985 | Roberts et al. | 24/20 EE X |

FOREIGN PATENT DOCUMENTS 1187079 2/1965 Fed. Rep. of Germany ... 24/20 TT

Primary Examiner—Kenneth J. Dorner
Assistant Examiner—James R. Brittain
Attorney, Agent, or Firm—Frishauf, Holtz, Goodman & Woodward

[57] ABSTRACT

A hose band is formed into a ring, in order to be wrapped around a hose. When the band is wrapped around the hose, its end portions are superposed, one overlying the other. Projections are formed on the underlying end portion, in order to be fitted into the holes made in the overlying end portion. A tightening lug is included in the overlying end portion of the band. The lug comprises a pair of outwardly protruding legs set apart in the lengthwise direction of the band, and a main section connecting the upper ends of the legs and plastically bent in such a way that the portion, which is the center as viewed in the widthwise direction, protrudes inwardly, and both end portions protrude outwardly.

19 Claims, 6 Drawing Sheets

HOSE BAND

BACKGROUND OF THE INVENTION

This invention relates to a hose band for tightly fitting a hose to a pipe. FIG. 1 shows a conventional hose band comprising ring-shaped metal band 1 with one end portion superposed upon the other, and hook 2 protruding from that end portion of band 1 underlying the other end portion. The overlying end portion of band 1 has an engagement hole 3. Band 1 has lug portion 4 connecting the overlying end portion and the middle portion of band 1. Lug portion 4 consists of two leg portions 5 and a main portion 6 connecting portions 5. When ring-shaped band 1 is squeezed until hook 2 slips into the hole, it is then fitted around a hose (not shown) which in turn is loosely mounted on a pipe (not shown). When leg portions 5 are pressed toward each other in the directions of arrows $f_1$ and $f_1'$, thus plastically deforming lug portion 4, the diameter of the ring-shaped band 1 is reduced. As a result, band 1 tightens the hose on the pipe.

The conventional hose band has several drawbacks. Since band 1 does not have great mechanical strength, the plastic deformation of lug 4 causes main portion 6 to buckle outward and extend in the direction of $f_2$ and $f_2'$, as is shown in FIG. 2. Consequently, the tightening force of the hose band is limited. Moreover, the protrusion of lug 4 sometimes presents a noticeable obstruction.

A countermeasure against this drawback is proposed in U.S. Pat. No. 4,299,012 which represents a hose band comprising a protrusion extending inwardly from the portion which corresponds to main portion 6 of the conventional hose band. This protrusion alone cannot sufficiently reinforce said portion. Hence, the tightening force cannot be sufficiently increased, nor can the protrusion of the tightening lug be made significantly small.

SUMMARY OF THE INVENTION

Accordingly, the object of this invention is to provide a hose band having a sufficient tightening force and having a tightening lug portion which has a relatively small protrusion.

According to one aspect of the invention, a hose band is provided, which comprises a metal band wrapped around a hose and having two end portions, one overlying the other, an engagement hole formed in the overlying end portion of the metal band, a projection formed in the underlying end portion of the metal band and arranged to be fitted into said engagement holes, and a tightening lug which is included in the metal band, and comprising a pair of outwardly protruding legs set apart in the lengthwise direction of the band, and a main section connecting the upper ends of the legs, and plastically bent in such a way that the portion which is the center as viewed in the widthwise direction protrudes inwardly, and both end portions protrude outwardly.

In the hose band of this invention, the main part of the tightening lug is plastically bent in such a way that the portion, which is the center as viewed in the widthwise direction, protrudes inwardly, and both end portions protrude outwardly, thereby forming a rib portion and a protruding portion. When any legs of the lug are plastically deformed, any bending of the main part of the lug is prevented. Even if a strong tightening force is applied to the hose band, the main part does not become elongated. This ensures the maintenance of a strong tightening force.

BRIEF DESCRIPTION OF THE DRAWINGS

FIGS. 3 to 14 illustrate a hose band embodying this invention, in which

FIG. 3 is a side view of the subject hose band;

FIG. 4 is a plan view of the projections of the same;

FIG. 5 is a side view of the projections;

FIG. 6 is a sectional view of the projections, taken along line VI—VI of FIG. 5;

FIG. 7 is a side view showing the projections fitted in the engagement hole;

FIG. 8 is a side view of a tightening lug used with the subject hose band;

FIG. 9 is a sectional view taken along the line IX—IX of FIG. 8;

FIG. 10 is a plan view of the tightening lug of the subject hose band;

FIG. 11 shows the legs elastically deformed;

FIG. 12 shows the tip of the underlying end portion of the hose band;

FIG. 13 is a sectional view on the line XIII—XIII of FIG. 12;

FIG. 14 is a sectional view of a hose band fitted around a hose, in order to fix the hose to a pipe.

DETAILED DESCRIPTION OF THE PREFERRED EMBODIMENTS

Hose band 11, an embodiment of the invention, will now be described with reference to FIGS. 3 to 14.

Figure 1:
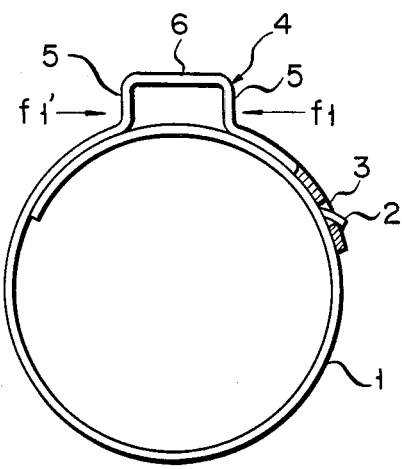
FIG. 1 is a front view of the conventional hose band.
Figure 2:
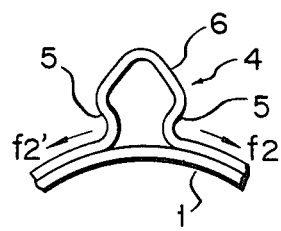
FIG. 2 is a cross-sectional view of the hose band of FIG. 1, with its lug portion plastically deformed.
Figure 3:
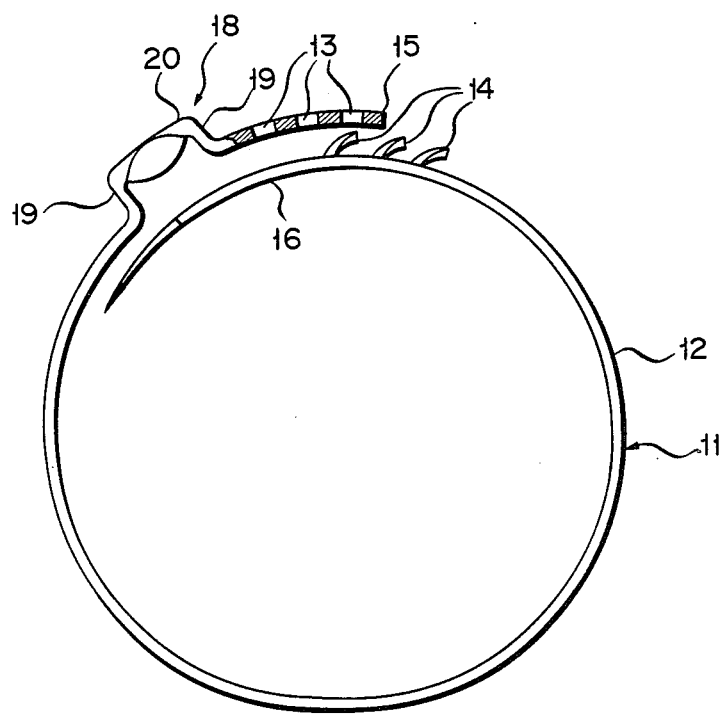

As is shown in FIG. 3, hose band 11 comprises a band 12 made of metal, such as stainless steel, and having two free ends. In order to be used, band 12 is formed into a ring, with one end portion 15 overlying the other end portion 16 for a predetermined distance in the lengthwise direction. Projections 14 are integrally formed with and upwardly protrude from underlying end portion 16. Engagement holes 13 are cut in overlying end portion 15. Projections 14 are detachably inserted in respective holes 13, thereby connecting end portions 15 and 16.

Figure 4:
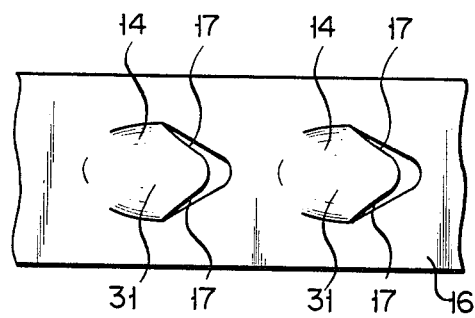
Figure 5:
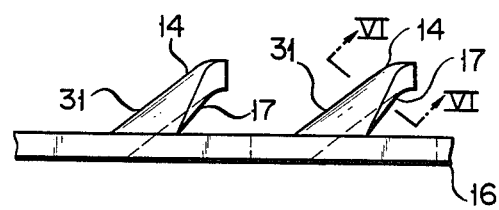
Figure 6:
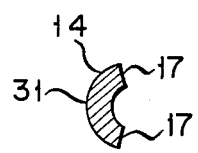
Figure 7:
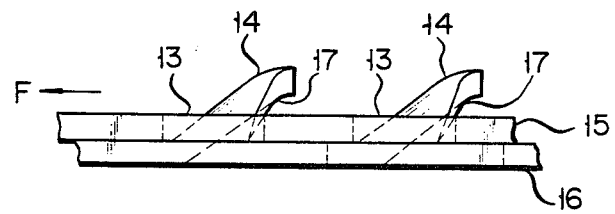
Figure 8:
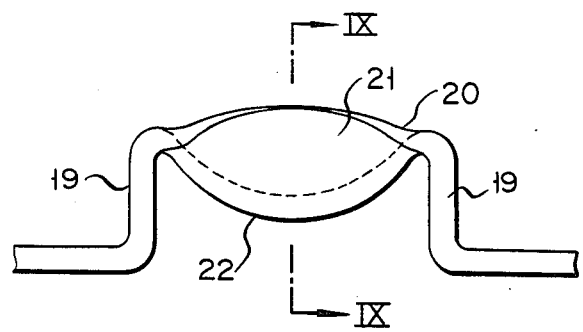

As FIGS. 4 and 5 show, projections 14 are formed by partially cutting and obliquely raising the required portions of metal band 12. Hence, when band 12 is formed into a ring, as is shown in FIG. 3, the projections obliquely protrude toward overlying end portion 15. Both sides 17 of each projection are inclined to band 12 at a predetermined angle. As FIG. 6 shows, each projection 14 has a protuberance 31 and inclined sides 17, and has an arcuate cross section bulging outwardly.

Figure 9:
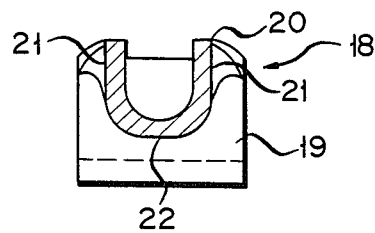
Figure 10:
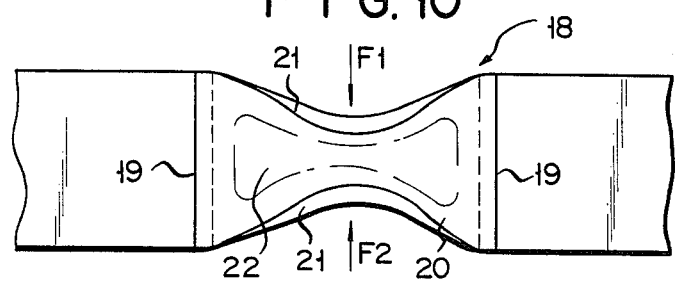

As is shown in FIG. 3, tightening lug 18 is formed near the end of overlying end portion 15. It is formed by bending that portion of metal band 12 which is continuous to portion 15. It comprises a pair of rising legs 19 set apart in the lengthwise direction of band 12, and main section 20 connecting the upper ends of legs 19. As FIG. 10 shows, main section 20 is pressed from both sides of band 12, in the directions of arrows $F_1$ and $F_2$, and is plastically bent in such a way that the portion which is the center as viewed in the widthwise direction, protrudes inwardly, and both end portions 15 and 16 protrude outwardly, and have a substantially U-shaped cross section, as is shown in FIG. 9. Since it has this U-shaped cross section, main section 20 has ribs 21 on both sides. That portion of main section 20 between ribs 21 sags, thereby forming downward protrusion 22. As a result, main section 20 has great mechanical strength. Ribs 21 and protrusion 22 can be simultaneously formed by a single punching process.

Figure 12:
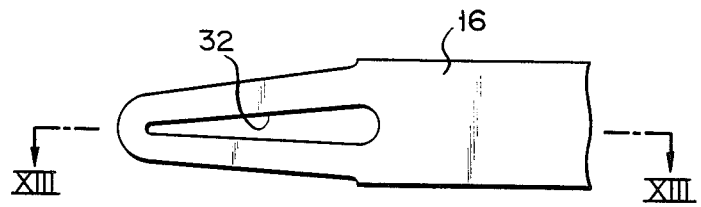
Figure 13:

As is shown in FIG. 12, the end of underlying end portion 16 of metal band 12 is triangular (substantially an isosceles). As is shown in FIG. 13, end portion 16 tapered, becoming progessively thinner toward the tip. Elongated hole 32 is cut in portion 16 by a press-punching process. This hole becomes progressively narrower toward the tip of portion 16.

Figure 11:
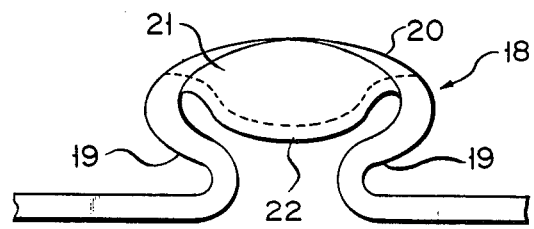
Figure 14:
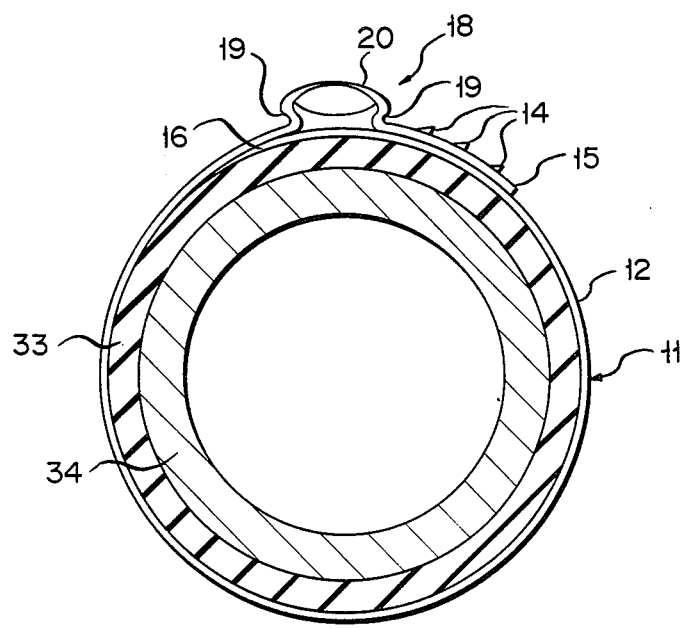

Hose band 11 fabricated as described above, is wrapped around hose 33 (FIG. 14), and projections 14 are inserted into respective engagement holes 13 of overlying end portion 15 of metal band 12. Then, lug 18 is plastically deformed with the aid of a jig, as is shown in FIG. 11. As a result, band 12 is compressed and its diameter is thereby reduced, thereby tightly fitting hose 33 to pipe 34 (FIG. 14).

Since main section 20 of lug 18 has ribs 21 and downward protrusion 22, it has great mechanical strength and does not buckle even when leg portions 19 are plastically deformed. Therefore, lug 18 can withstand a greater pressure than the lug of the conventional hose band, and can serve to connect hose 33 to pipe 34 more strongly. Since lug 18 protrudes to a lesser extent than in the conventional hose band, hose band 11 presents less of an obstruction to the surrounding members when it is wound around hose 33.

As is mentioned above, projections 14 have both sides 17 inclined toward the tip of overlying end portion 15 of rounded metal band 12. When, therefore, hose band 11 is tightly wrapped around hose 33, with projections 14 fitted into engagement holes 13, inclined sides 17 contact the periphery of holes 13. End portions 15 and 16 of rounded band 12 are attached tightly to each other, thereby preventing projections 14 from slipping out of holes 13. Moreover, since at least the base of each projection 14 has an arcuate cross section, as is shown in FIG. 6, projections 14 can therefore withstand a strong tensile force.

Since underlying end portion 16 becomes progressively narrower and thinner toward the tip and has an elongated hole 32, its tip portion is ready to bend along the periphery of hose 33, and can tightly clamp said periphery.

When tightening lug 18 is deformed and compresses hose 33, end portions 15 and 16 of rounded band 12 are relatively moved. Since underlying end portion 16 becomes progressively narrower and thinner toward the tip, its tip portion slides smoothly along the periphery of hose 33, thereby suppressing the occurrence of creases along the periphery. Further, since underlying end portion 16 becomes progressively thinner toward the tip, no stepped portions will be formed when hose 33 is tightly clamped. This ensures sufficient sealing around the entire periphery of hose 33.

Since end portion 16 of metal band 12 gradually narrows toward the tip and has elongated hole 32, and has a smaller area than other wise, it can be more easily rolled to be gradually thin toward the tip, than otherwise. The tip of portion 16 can be easily pressed for the same-purpose. Because it has elongated hole 32, the tip of underlying end portion 16 consists of, so to speak, two parts divided by hole 32. Obviously, two parts can clamp a hose more strongly than one prong, thereby more effectively sealing the hose.

The cross section of main section 20 of lug 18 can have any shape other than a U-shape. It can be V-shaped or can be shaped like a horseshoe. Further, ribs 21 of said main section 20 of lug 18 can be crushed to press tightly against each other.

Figure 15:
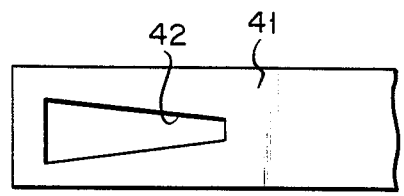
FIGS. 15 to 23 are plan views of modifications of the underlying end portion of the hose band.
Figure 16:
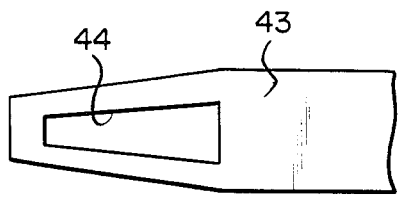
Figure 17:
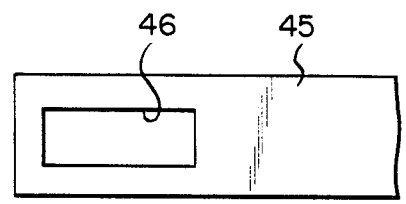
Figure 18:
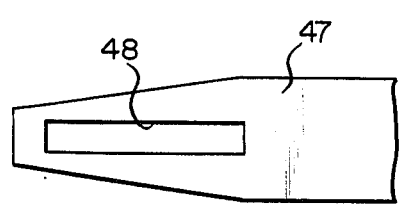
Figure 19:
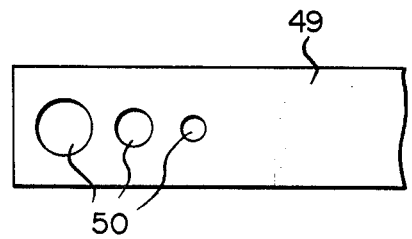
Figure 20:
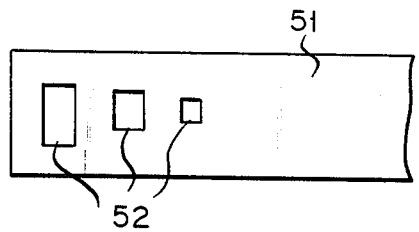

Elongated hole 32 can have other shapes, as is shown in FIGS. 15 to 18. It can be replaced by a plurality of holes 50 punched in the tip end of and set apart in the lengthwise direction of underlying end portion 16, as is shown in FIGS. 19 and 20. In the modification of FIG. 15, underlying end portion 41 of metal band 12 has a uniform width, and has a trapezoidal elongated hole 42 which becomes progressively broader away from the tip of portion 41. In the modification of FIG. 16, underlying end portion 43 of metal band 12 has a trapezoidal tip, and has a trapezoidal elongated hole 44 which gradually narrows toward the tip. In the modification of FIG. 17, underlying end portion 45 has a uniform width up to the tip, and has rectangular hole 46 punched in and extending in the lengthwise direction of portion 45. In the modification of FIG. 18, underlying end portion 47 has a trapezoidal tip, and has a rectangular elongated hole 48 punched in the trapezoidal tip and extending in the lengthwise direction of portion 47. In the modification of FIG. 19, underlying end portion 49 is rectangular and has circular holes 50 cut in the tip and set apart in the lengthwise direction of portion 49. The closer it is to the tip, the larger is each hole 50. In the modification of FIG. 20, underlying end portion 51 is also rectangular and has rectangular holes 52 arranged parallel and set apart in the lengthwise direction of portion 51. The closer it is to the tip, the longer is each hole 52.

Figure 21:
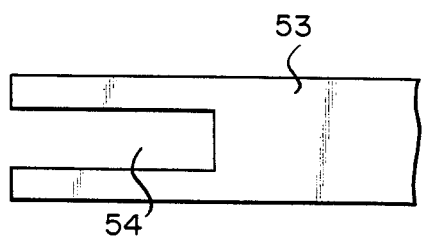
Figure 22:
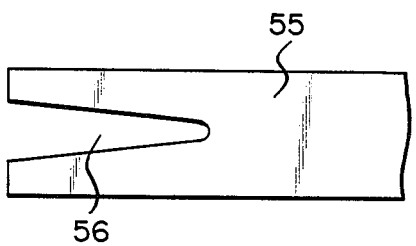
Figure 23:
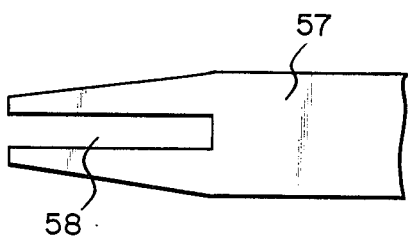

As is shown in FIGS. 21 to 23, the punched holes may be replaced by notches. In the modification of FIG. 21, underlying end portion 53 has a rectangular tip and a rectangular notch 54 cut in and extending in the lengthwise direction of the tip. In the modification of FIG. 22, underlying end portion 55 is rectangular, has a V-notch 56 cut in the tip portion, extending in the lengthwise direction of, and progressively broadening toward the tip of portion 55. In the modification of FIG. 23, underlying end portion 57 has a trapezoidal tip and a rectangular notch 58 cut in the tip and extending in the lengthwise direction of portion 57.

In the modifications of FIGS. 15 to 23, the underlying end portion is tapered, becoming progressively thinner toward the top. The hose bands of this invention can be used effectively when it is desired to securely fix the bellows portion of, for example, the boots of a uniformly driven joint.

What is claimed is:

1. A hose band defining an inner area with an inward direction extending toward said inner area and an outward direction extending away from said inner area, comprising:
a metal band having two faces, an inwardly and an outwardly facing surface each including in the widthwise direction of the band a terminal free surface adapted to be wrapped around a hose and having two end portions, one overlying the other;
an engagement hole formed in the overlying end portion of the metal band;
a projection formed in the underlying end portion of the metal band and arranged to be fitted into said engagement hole; and a tightening lug forming part of the metal band and comprising a pair of legs protruding a given distance from said band in the outward direction and set apart in the lengthwise direction of the band, and a main section connecting the outermost ends of the legs, said main section, when viewed in the widthwise direction of said band, having a center portion between two side edges of the main section thereby defining each of said side edges as including portions of said inwardly and outwardly facing surfaces, said main seciton being plasticially bent in such a way that the center portion protrudes in the inward direction relative to said given distance, and lines tangent to either said inwardly facing or outwardly facing terminal free surfaces of the side edges extend in the outward direction;

wherein the side edges of said main section comprise ribs having at least a portion thereof extending away from said legs to project in the outward direction relative to said given distance.

2. The hose band according to claim 1, wherein the main section of the lug has a cross section in the form of a letter U, or a letter V, or a horseshoe.

3. The hose band according to claim 1, wherein the main section of the lug is plastically formed to have a U-shaped cross section.

4. The hose band according to claim 1, wherein the tightening lug is a bend in the metal band.

5. The hose band according to claim 1, wherein the projection has protruding edges inclined in the lengthwise direction of the metal band.

6. The hose band according to claim 5, wherein the projection has an outwardly bulging part surrounded by the inclined protruding edge.

7. The hose band according to claim 1, wherein the underlying end portion of metal band is tapered, becoming progressively thinner toward the end.

8. The hose band according to claim 1, wherein the end portion of the underlying end portion of the metal band has at least one hole or a notch formed in the lengthwise direction of the metal band.

9. The hose band according to claim 1, wherein said center portion is formed in an arc extending in the lengthwise direction of the band and curved in said inwardly direction.

10. The hose band according to claim 1, wherein said ribs face each other.

11. A hose band defining an inner area with an inward direction extending toward said inner area and an outward direction extending away from said inner area, comprising:

a metal band having two faces, an inwardly and an outwardly facing surface each including in the widthwise direction of the band a terminal free surface adapted to be wrapped around a hose and having two end portions, one overlying the other;

an engagement hole formed in the overlying end portion of the metal band;

a projection formed in the underlying end portion of the metal band and arranged to be fitted into said engagement hole; and a tightening lug forming part of the metal band and comprising a pair of legs protruding a given distance from said band in the outward direction and set apart in the lengthwise direction of the band, and a main section, when viewed in the widthwise direction of said band, having a center portion between two side edges of the main section thereby defining each of said side edges as including portions of said inwardly and outwardly facing surfaces, said main section being plastically bent in such a way that the center portion protrudes in the inward direction relative to said given distance, and lines tangent to either said inwardly facing or outwardly facing terminal free surfaces of the side edges extend in the outward direction;

wherein the side edges of said main section comprise ribs having at least a portion thereof extending away from said legs to project in the outward direction relative to said given distance.

12. The hose band according to claim 11, wherein the main section of the lug has a cross section in the form of a letter U, or a letter V, or a horseshoe.

13. The hose band according to claim 11, wherein the main section of the lug is plastically formed to have a U-shaped cross section.

14. The hose band according to claim 11, wherein the tightening lug is a bend in the metal band.

15. The hose band according to claim 11, wherein the projection has protruding edges inclined in the lengthwise direction of the metal band.

16. The hose band according to claim 15, wherein the projection has an outwardly bulging part surrounded by the inclined protruding edges.

17. The hose band according to claim 11, wherein the underlying end portion of the metal band is tapered, becoming progressively thinner toward the end.

18. The hose band according to claim 11, wherein the end portion of the underlying end portion of the metal band has at least one hole or a notch formed in the lengthwise direction of the metal band.

19. The hose band according to claim 11, wherein said ribs face each other.

* * * * *